J. M. HIRSH.
Process and Apparatus for Deodorizing and Disinfecting.
No. 221,232. Patented Nov. 4, 1879.
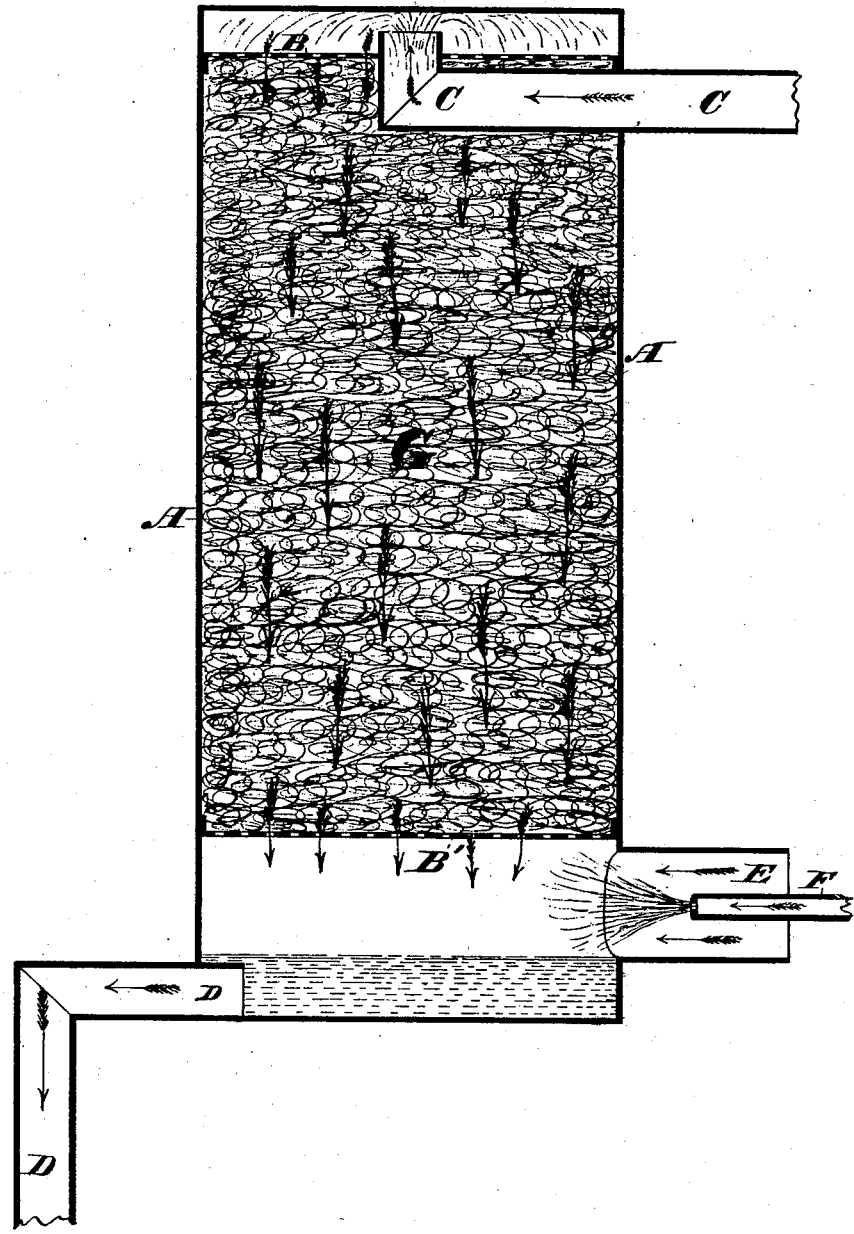
Attest:
W. T. Baker
L. T. Dyrenforth
INVENTOR:
Joseph M. Hirsh,
By P. C. Dyrenforth
Attorney.

UNITED STATES PATENT OFFICE.

JOSEPH M. HIRSH, OF CHICAGO, ILLINOIS.

IMPROVEMENT IN PROCESSES AND APPARATUS FOR DEODORIZING AND DISINFECTING.

Specification forming part of Letters Patent No. 221,232, dated November 4, 1879; application filed November 8, 1878.

*To all whom it may concern:*

Be it known that I, JOSEPH M. HIRSH, of the city of Chicago, in the county of Cook and State of Illinois, have invented certain new and useful Improvements in Processes and Apparatus for Deodorizing and Disinfecting; and I hereby declare the following to be a full, clear, and exact description thereof, reference being had to the accompanying drawing, which represents a vertical central section of an apparatus adapted to carry my invention into effect.

My invention relates, chiefly, to the deodorizing and purifying of rendering-establishments, fertilizing-houses, and the like; and my object is to effect by chemical means the total conversion into salts of the noxious gases and vapors arising during the rendering and drying of animal and other organic matter, whether the same result from decay or the application of heat.

My invention consists, first, in causing the noxious gases to flow from the point of their origin into a tank or vessel, where they encounter a shower or spray or liquid body of chemicals, consisting of metallic salts in solution mixed with a solution of organic salts, which mixed chemical solution has the property of neutralizing all the acid and alkaline substances which can possibly be generated during the process of rendering, drying, or otherwise treating organic matter; and, secondly, in the general construction of the apparatus which I prefer to employ, all as hereinafter more fully set forth.

Referring to the drawing, A is a cylindrical tank wholly inclosed, and having a perforated diaphragm, B, crossing its interior near the top, and another, B', near the bottom, both diaphragms being parallel with the top and bottom. C is an induct-pipe, entering the tank below the plane of the upper diaphragm, thence passing through an orifice in the center of the said diaphragm, and terminating at some point below the top. D is an educt-pipe, and E F an ordinary steam-injector, entering the tank below the level of the diaphragm B'.

The space between the diaphragms B and B' should be loosely filled with either charcoal, curled beech-shavings, such as are used in the manufacture of vinegar, or a mixture of both, in order to afford as large a surface of contact as possible to the gases and vapors and the chemical solution. The only object of the perforated diaphragms is to form a chamber for this purpose within the tank. G represents the filling.

Through the pipe C, I forcibly inject a highly-diluted mixture of solutions of metallic salts and organic salts.

By preference I use the nitrates of iron and the salts of the phenyl, xylol, cresyl, thymol, vasol, and brunol series; but any other metallic salt in connection with any other organic salt will answer the purpose.

I recommend any one of the following mixtures as being more cheaply and easily produced than any others which will neutralize a like relative quantity of gases: Nitrate of thymol with protonitrate of iron; nitrate of thymol with pernitrate of iron; nitrate of pyrrhol with protonitrate of cresyl; nitrate of pyrrhol with pernitrate of cresyl; nitrate of iron with cresylate of iron; nitrate of iron with cresylate of zinc.

In general, one metallic salt in conjunction with one organic salt, as above, is sufficient; but where it is difficult to obtain them chemically pure two, or even more, varieties of each or either may be employed jointly. For example, both nitrate of thymol and nitrate of pyrrhol might be mixed with both pernitrate of iron and protonitrate of cresyl; or any one of the above metallic salts might be mixed with any two or more of the organic salts, or vice versa. The liquid, upon being forced, as aforesaid, through the pipe C, strikes against the top of the tank and divides into a spray or shower.

The gases or vapors from the driers or rendering-vats are carried into the tank by means of the steam-injector, which operates in the ordinary way—that is to say, by driving steam through a narrow orifice in a small pipe, F, into a large tube, E, which latter may be of any required length, thereby causing a vacuum and consequent draft of gases and vapors in the direction of the steam. The gases and vapors, being thus brought into intimate contact with the chemical solution above described, are wholly neutralized, entering into complete chemical union with the said solution to form odorless and non-volatile salts, which descend in solution to the bottom of the tank, whence they flow out through the outlet-pipe D.

I am aware that methods of disinfecting and deodorizing have heretofore been employed in which the noxious gases have been passed through a vessel containing, in solution, chemical substances adapted in a measure to disinfect them, or more or less to deprive them of their odor, or else to disguise the same by charging them with fumes having a controlling odor of a less offensive nature, the gases being then permitted to escape. My invention, however, differs widely from all these, for by my process, as has already been explained, the gases, as such, wholly and absolutely cease to exist, entering completely into chemical combination with the ingredients employed for the purpose, and passing off in the form of non-offensive salts in solution. I deem this to be a very important feature, since where the matters are permitted to escape, still retaining their gaseous form, they are never completely disinfected, or deodorized, or disguised, and are liable, after passing into the open air, to regain more or less of their unwholesome and offensive properties.

While I recommend the mode hereinbefore described of carrying out my invention as being probably the most feasible, I nevertheless do not wish to be understood as limiting myself specifically thereto, for the essence of my invention consists in the bringing of the noxious gases into intimate association with the particular classes of chemicals named, whereby the former are wholly neutralized, and this may obviously be accomplished in various ways. For example, instead of meeting the chemicals in a shower, the gases may be forced directly into a body of such chemical solution, the latter being withdrawn and replenished continuously or from time to time; or the chemicals, instead of being previously diluted and injected, as described, may be mixed together in a concentrated solution and placed within a receptacle above the tank, whence they flow into the tank in a small stream and mingle with the water for dilution. Means other than the steam-jet, moreover, may be employed to force the gases into the tank; and where the tank is at a sufficient altitude above the ground to give the pipe D a vertical height of thirty-two feet or more no forcing means at all, such as a steam injector or blower, need be employed, since the outpassing liquid then creates a vacuum within the tank, to fill which vacuum the gases must of necessity rush in. To avoid constructing the apparatus on too large a scale, several may be employed, if necessary.

In removing the vapors from tanks wherein fat is rendered I pass them through a concentrated solution of the chemicals mentioned, and divide the steam escaping from the said solution of chemicals and freed from noxious gases and odors into many steam-jets, which I cause to flow into an open pipe, when they draw sufficient cold air with them fully to condense them.

What I claim as new, and desire to secure by Letters Patent, is—

1. The process herein described of disinfecting and deodorizing noxious gases, which consists in converting the said noxious gases into salts by bringing the same into contact with a liquid composed of metallic salts in solution mixed with a solution of organic salts, substantially as described.

2. The combination of the close vessel A, perforated diaphragms B B', inlet-pipe C, entering through the side of the tank A, passing upward through the center of the diaphragm B, and terminating below the top of the tank, outlet-pipe D, and steam-injector E F, substantially as described.

JOSEPH M. HIRSH.

In presence of—
WM. SEESLAND,
P. C. DYRENFORTH.